US00RE43259E

(19) United States
(12) Reissued Patent
Janson et al.

(10) Patent Number: US RE43,259 E
(45) Date of Reissued Patent: Mar. 20, 2012

(54) MULTIPLE SPEED TRANSMISSION PRODUCING A LOW-RANGE

(75) Inventors: David A. Janson, Plymouth, MI (US); Reid A. Baldwin, Howell, MI (US)

(73) Assignee: Ford Global Technologies, LLC, Dearborn, MI (US)

(21) Appl. No.: 11/973,594

(22) Filed: Oct. 9, 2007

Related U.S. Patent Documents

Reissue of:
(64) Patent No.: 7,086,987
Issued: Aug. 8, 2006
Appl. No.: 10/941,709
Filed: Sep. 15, 2004

(51) Int. Cl.
*F16H 3/44* (2006.01)

(52) U.S. Cl. ..... 475/284; 475/296; 475/276; 180/245

(58) Field of Classification Search ..... 475/284, 475/278, 276, 296; 180/245–247
See application file for complete search history.

(56) References Cited

U.S. PATENT DOCUMENTS 5,982,045 A * 11/1999 Tabata et al. ..... 290/17
6,634,981 B1 10/2003 Raghavan et al.
6,679,803 B1 1/2004 Raghavan et al.
6,709,359 B2 3/2004 Usoro et al.
6,743,145 B2 6/2004 Usoro et al.
6,758,785 B2 7/2004 Raghavan et al.
6,773,371 B2 8/2004 Lee et al.
6,846,263 B2 1/2005 Lee et al.
6,955,627 B2 * 10/2005 Thomas et al. ..... 475/283
2003/0125153 A1 * 7/2003 Kukucka et al. ..... 475/198
2005/0101431 A1 * 5/2005 Allen et al. ..... 475/286

* cited by examiner

*Primary Examiner* — Tisha D Lewis
(74) *Attorney, Agent, or Firm* — David B. Kelley, Esq.; MacMillan, Sobanski & Todd, LLC

(57) ABSTRACT

A multiple speed transmission for an automotive vehicle includes an input and an output, a planetary gear system comprising first, second and third planetary gear units, each gear unit including a sun gear, a ring gear, planet pinions meshing with the sun gear and ring gear, and a carrier rotatably supporting the planet pinions. A forward clutch releasably connects the carrier of the second gear unit and the carrier of the third gear unit. A second clutch releasably connects the carrier of the first gear unit to the ring gear of the second gear unit. A third clutch releasably connects the ring gear of the third gear unit to the carrier of the second gear unit. First brake releasably holds the carrier of the third gear unit against rotation.

23 Claims, 3 Drawing Sheets

| | 86 | 88 | 94 | 102 | 98 | 90 | Torque Ratio |
|---|---|---|---|---|---|---|---|
| | CL1 | CL2 | CL3 | B1 | B2 | CL4 | |
| Rev | | | X | X | | | -3.724 |
| Low | | | | X | | X | 6.692 |
| 1st | | X | | X | | | 3.449 |
| 2nd | | X | | | X | | 1.965 |
| 3rd | | X | X | | | | 1.405 |
| 4th | | X | | | | X | 1.000 |
| 5th | X | X | | | | | 0.763 |

Figure 4

| | |
|---|---|
| beta 1 | 2.281 |
| beta 2 | 2.243 |
| beta 3 | 1.538 |

Figure 5

MULTIPLE SPEED TRANSMISSION PRODUCING A LOW-RANGE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to multiple speed automatic transmissions of the type used in motor vehicles. In particular, this invention pertains to a transmission that produces a low gear ratio that is suited for high torque, low vehicle speed conditions.

2. Description of the Prior Art

In a motor vehicle powertrain having four-wheel drive or all-wheel drive capability, an automatic transmission is driveably connected to an engine crankshaft and produces multiple ratios of the engine speed at a transmission output shaft, which is connected to the input of a transfer case. The transfer case generally includes a planetary gear unit for producing a high range and low range, which ranges potentially adjust the speed of the transfer case output relative to the speed at the transmission output. Usually the high range is a direct drive range in which the transfer case produces no speed reduction or torque amplification of the speed and torque at the transmission output. The low range amplifies the torque and decreases the speed of the transmission output. Operation in the low range is usually reserved for low speed, high torque or towing conditions; the high range is best suited for highway conditions.

In addition to producing both high and low speed ranges, the transfer case continually connects its output to a first set of vehicle wheels and selectively connects its output to a second set of wheels. Generally the vehicle must stop in order to change the range of operation of the transfer case into and out of the low range. When the low range is produced in the transfer case, the clutches that control the range-producing gear unit must be large in diameter and torque capacity in order to transmit the high torque associated with the low range.

It would be preferred that the transmission itself produce the low range speed ratio that conventionally is produced in the transfer case. If the transmission could produce the low-range ratio, the planetary gearing and friction elements associated with the range change in the transfer case could be eliminated. The controls required to coordinate transfer case operation with the requirements of the vehicle system could be located, at least in part, within the transmission and under control of the transmission control system. This would reduce transfer case complexity without unduly increasing the complexity of the transmission control system, or changing the nature or quality of the shift control normally provided by an automatic transmission control system.

If the transmission produced the low-range ratio, the low-range could be actuated on-the-fly, i.e., while the vehicle is moving under power, without stopping the vehicle to actuate and engage the low-range.

SUMMARY OF THE INVENTION

The invention relates to an automatic transmission that produces at least five forward drive ratios providing an excellent ratio span for highway operation, and a low-range that is selected by the vehicle operator, preferably by manually depressing a low-range selector button located on or near the transmission gear selector lever. Preferably the low-range does not operate when the transmission automatically shifts among the forward speeds. Positive action by the operator indicating a desire to engage the low-range would be required to actuate and produce low-range operation.

A transmission can be included in a vehicle powertrain that includes a transfer case. The transmission produces a low-range torque ratio that is selected by the vehicle operator when low speed high torque operation is required. In this case, the transfer case need not have the capability to produce a low-range torque ratio. The package space normally required for a conventional transfer case can be reduced because planetary gearing normally located in the transfer case is eliminated. The transmission can produce at least five forward speeds, reverse drive and a low-range in a compact unit.

A vehicle powertrain that includes a transmission according to this invention can be shifted on-the-fly to produce the low-range torque ratio, and to exit low-range operation. This permits the operator to maintain vehicle momentum both while ascending a hill and enabling the low-range to increase wheel torque, and to enhance engine braking for slowing the vehicle when descending a grade.

A multiple speed transmission according to this invention that produces a low-range and multiple automatically produced speeds include an input, an output, and a planetary gear system. The planetary gear system includes first, second and third planetary gear units, each gear unit including a sun gear, a ring gear, planet pinions meshing with the sun gear and ring gear, and a carrier rotatably supporting the planet pinions. The input is connected to the sun gear of the second gear unit, the output is connected to the ring gear of the third gear unit, the sun gear of the first gear unit is held against rotation, the ring gear of the first gear unit and the carrier of the second gear unit are connected mutually, and the ring gear of the second gear unit and the sun gear of the third gear unit are connected mutually. A clutch releasably connects the carrier of the second gear unit and the carrier of the third gear unit. A second clutch releasably connects the carrier of the first gear unit to the ring gear of the second gear unit. A third clutch releasably connects the ring gear of the third gear unit to the carrier of the second gear unit. A first brake releasably holds the carrier of the third gear unit against rotation, and a second brake releasably holds the sun gear of the third gear unit against rotation.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a chart that shows a schedule of engagement and disengagement of the clutches and brakes for controlling forward drive ratios, reverse drive, and the low-range of the transmission of FIG. 2.

FIG. 5 is a chart that shows the ratio of the diameter or number of teeth of the ring gear to that of the sun gear, for each of the gear units of FIG. 2. The ratio has the value beta.

DETAILED DESCRIPTION OF THE PREFERRED EMBODIMENT

Figure 1:
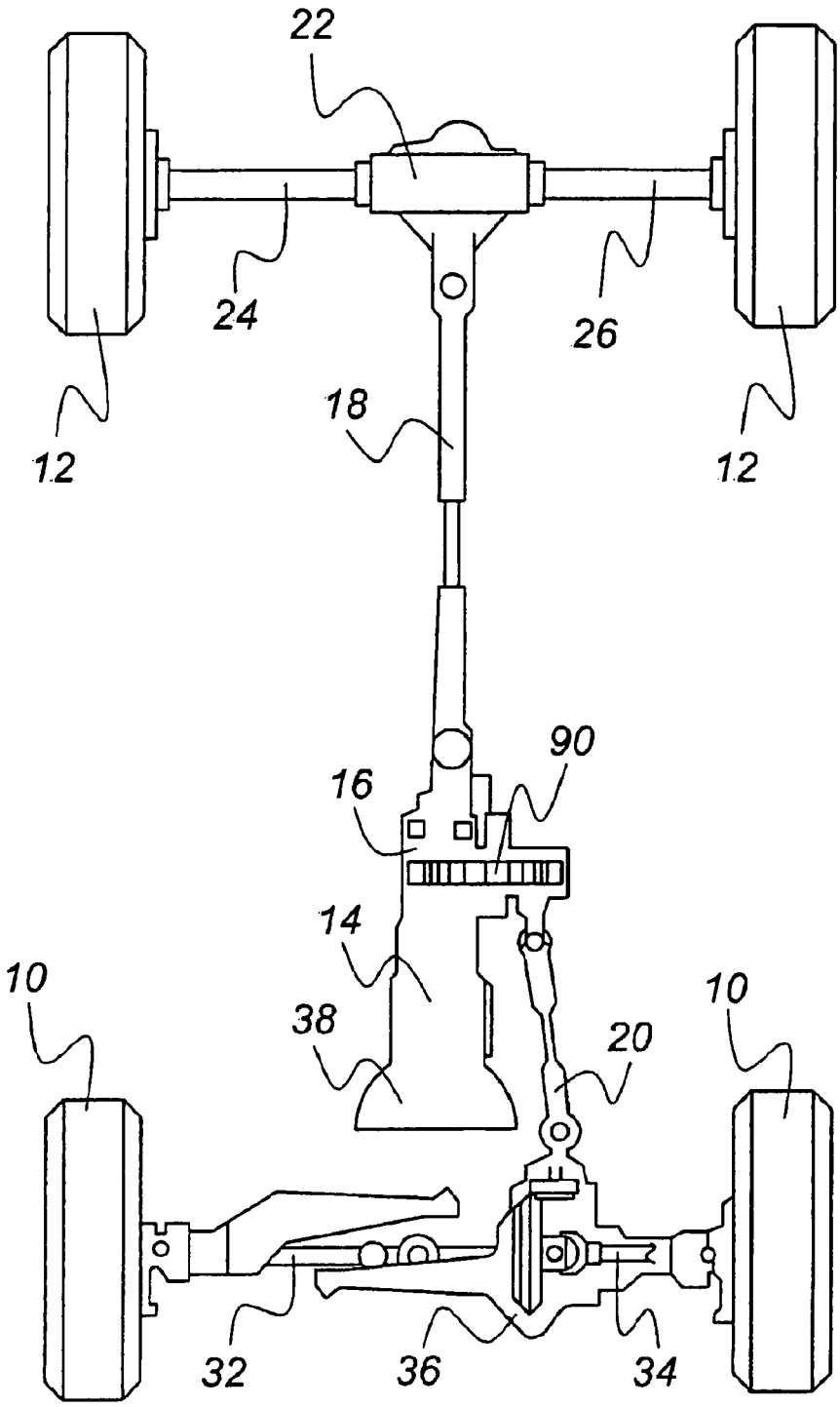
FIG. 1 is a top view of a motor vehicle driveline having a transmission, transfer case, and drive shafts extending to the front wheels and rear wheels.

Referring first to FIG. 1, a motor vehicle powertrain, to which the present invention can be applied, includes front and rear wheels 10, 12, a power transmission 14 for producing multiple forward speed ratios and reverse drive, and a transfer case 16. When two-wheel drive operation of the powertrain is selected, the transfer case 16 driveably connects the transmission output to a rear drive shaft 18; when a four-wheel-drive operation is selected, the transfer case connects the transmission output concurrently to both the front drive shaft 20 and rear drive shaft 18. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand axle shafts 32, 34, to which power is transmitted from the front drive shaft 20 through a front differential 36.

Figure 2:
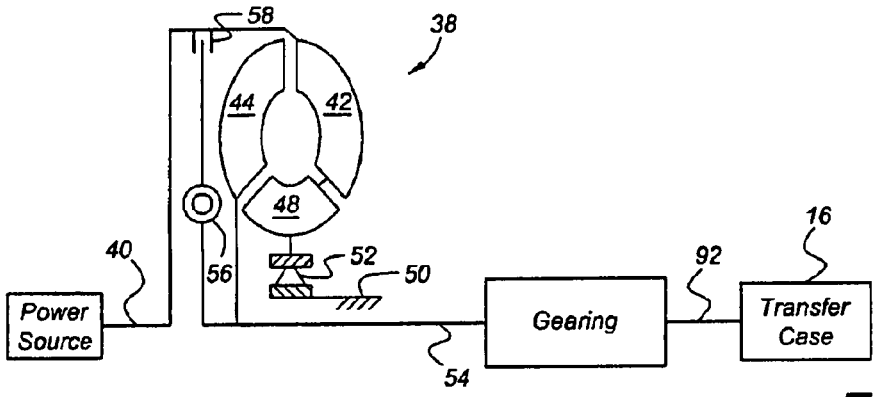
FIG. 2 is a schematic diagram showing a powertrain including a power source, torque converter, and the transmission input.

FIG. 2 shows a portion of the powertrain between an internal combustion engine, or another power source, and the transmission 14 wherein a hydrokinetic torque converter 38 is driveably connected to an engine having a crankshaft 40 connected to a bladed impeller 42 of the torque converter. A bladed turbine 44, a bladed stator 48, and the impeller 42 define a toroidal fluid flow circuit within the casing of the torque converter. The stator 48 is supported on a stationary sleeve shaft 50, and an overrunning brake 52 anchors the stator to shaft 50 to prevent rotation of stator 48 in a direction opposite to the direction of rotation of the impeller, although free-wheeling motion in the opposite direction is permitted. Turbine 44 is connected to transmission input shaft 54. Torsion damper 56 and lock-up clutch 58, are arranged in series between crankshaft 40 and the transmission input shaft 54. When clutch 58 is engaged, the engine drives input shaft 54 through a direct mechanical connection, but when clutch 58 is disengaged, shaft 54 is connected hydrodynamically to the engine through the torque converter.

Figure 3:
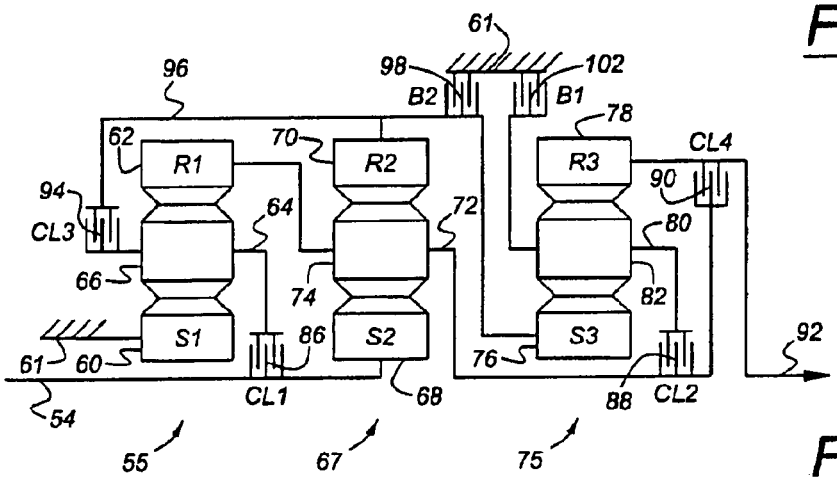
FIG. 3 is a schematic diagram showing a planetary gear system according to this invention, and a final drive.

Referring to FIG. 3, a planetary gear system located in the transmission includes three planetary gear units. The first gear unit 55 includes a sun gear 60 secure against rotation on the transmission housing 61, ring gear 62, carrier 64 and planetary pinions 66, rotatably supported on carrier 64 in meshing engagement with sun 60 and ring gear 62. The second planetary gear unit 67 includes a sun gear 68, a ring gear 70, carrier 72 and planet pinions 74, rotatably supported on carrier 72 in meshing engagement with sun gear 68 and ring gear 70. The third planetary gear unit 75 includes a sun gear 76, a ring gear 78, a carrier 80 and planet pinions 82, rotatably supported on carrier 80 in meshing engagement with sun gear 76 and ring gear 78.

Input shaft 54 is secured to sun gear 68 and is releasably connected by a friction clutch 86 to carrier 64. Carrier 72 is secured to ring gear 62. Carrier 72 is releasably connected by a forward clutch 88 to carrier 80, and by clutch 90 to ring gear 78 and the planetary gear system output 92. Carrier 64 is releasably connected by a friction clutch 94 to a drum 96, which is secured to ring gear 70 and to sun gear 76. Preferably the clutches and brakes are hydraulically actuated friction elements.

Brake 98 holds drum 96 against rotation on the transmission housing 61 when brake 98 is engaged, and releases drum 96 to rotate when brake 98 is disengaged. Similarly, brake 102 holds carrier 80 against rotation on the transmission housing 61 when brake 102 is engaged, and releases carrier 80 to rotate when brake 102 is disengaged.

If the transmission is used in a powertrain having no transfer case 16, the final drive output 92 is connected to a rear driveshaft 18 or to a front driveshaft. If the transmission is used in a powertrain having a transfer case 16, the final drive output 92 is continually connected to the rear driveshaft 18 and is selectively connected to the front driveshaft 20.

The planetary gear system includes three planetary gear units 55, 67, 75 located ahead of the final drive set for producing multiple forward torque ratios, reverse drive, and a low-range torque ratio. Engaging brake 102 and forward clutch 88 produces the first forward speed ratio. These engagements hold carrier 80 and carrier 72 against rotation on the transmission housing 61. Input shaft 54 drives the sun gear 68. Carrier 72 provides a torque reaction, and ring gear 70, which is under-driven in the reverse direction relative to input 54, drives sun gear 76. The torque reaction in the third gear set is provided at carrier 80, and ring gear 78 and output 92 are under-driven in the forward drive direction in relation to the speed of input 54, producing a torque ratio of 3.499 in the first forward gear.

Maintaining forward clutch 88 engaged, disengaging brake 102, and engaging brake 98 produces an upshift to the second forward speed ratio. Ring gear 70 provides a torque reaction in the second gear set 67, and sun gear 76 provides a torque reaction in the third gear unit 75 because they are fixed against rotation on the transmission housing. Input 54 drives sun gear 68, and carriers 72 and 80 are under-driven in the forward direction. Sun gear 76 is held, and ring gear 78 and output 92 are under-driven in the forward direction, producing a torque ratio of 1.965 in the second forward gear.

Maintaining forward clutch 88 engaged, disengaging brake 98, and engaging clutch 94 produce an upshift to the third forward speed. Sun gear 60 provides a torque reaction in the first gear unit 55 due to its connection to the transmission housing 61. Input shaft 54 drives sun gear 68 causing carrier 72 to drive ring gear 62. Ring gear 70 is driveably connected to carrier 64 through clutch 94. Ring gear 62, carrier 72, and carrier 80 rotate as a unit due to the engagement of clutch 88. Carrier 64, ring gear 70, and sun gear 76 rotate as a unit due to the engagement of clutch 94. The output is taken at ring gear 78 and output 92, which are under-driven in relation to the speed of input 54, producing a torque ratio of 1.405.

An upshift to the fourth forward speed results by maintaining forward clutch 88 engaged, disengaging clutch 94, and engaging clutch 90. Input 54 drives sun gear 68. Ring gear 62, carrier 72, and carrier 80 rotate as a unit due to the engagement of clutch 88. Similarly, ring gear 62, carrier 72, and ring gear 78 rotate as a unit at the same speed due to the engagement of clutch 90. This locks up the third gear set 75 and drives output 92 at a torque ratio of 1.0.

An upshift to the fifth forward speed is produced by disengaging clutch 90, engaging clutch 86 and maintaining forward clutch 88 engaged. The torque reaction is produced at sun gear 60. Input 54 drives carrier 64, and the output of the first gear unit 55 is taken at ring gear 62, which drives carrier 72 and carrier 80 due to the engagement of clutch 88. Carrier 80 is overdriven in relation to the speed of input 54. Input 54 also drives sun gear 68. Ring gear 70 and sun gear 76 are overdriven in the forward direction. The output of the third gear unit 75 is taken at ring gear 78 and output 92, which are overdriven in the forward direction, producing a torque ratio of 0.763.

Engaging brake 102 and clutch 94 produce reverse drive. Two torque reactions are provided: one at sun gear 60 and the other at carrier 80. Input 54 drives sun gear 68, causing carrier 72 and ring gear 62 to rotate at the same speed. Carrier 64, ring gear 70 and sun gear 76 rotate as a unit due to the engagement of clutch 94. With carrier 80 providing a torque reaction, the output of the third gear unit 75 is taken at ring gear 78 and output 92, which are driven in the reverse direction at a torque ratio of −3.724.

Low range is produced when brake 102 and clutch 90 are engaged. The torque reaction is provided at carrier 80, which is fixed against rotation on transmission case 61 due to the engagement of brake 102. Input 54 drives sun gear 68, causing carrier 72 and ring gear 78 to rotate as a unit due to engagement of clutch 90. Ring gear 70 and sun gear 76 rotate at the same speed. Carrier 80 is held against rotation. Therefore, the output of gear unit 75 is taken at ring gear 78 and output 92, which are driven at a torque ratio of 6.692.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multiple speed transmission for an automotive vehicle having a power source, comprising:

an input for carrying torque between the power source and a planetary gear system;

an output;

a planetary gear system comprising first, second and third planetary gear units, each gear unit including a sun gear, a ring gear, planet pinions meshing with the sun gear and ring gear, and a carrier rotatably supporting the planet pinions;

the input being connected to the sun gear of the second gear unit, the output being connected to the ring gear of the third gear unit, the sun gear of the first gear unit being held against rotation, the ring gear of the first gear unit and the carrier of the second gear unit being connected mutually, and the ring gear of the second gear unit and the sun gear of the third gear unit being connected mutually, a first clutch for releasably connecting the input and the carrier of the first gear unit;

a second clutch for releasably connecting the carrier of the second gear unit and the carrier of the third gear unit;

a third clutch for releasably connecting the carrier of the first gear unit to the ring gear of the second gear unit;

a fourth clutch for releasably connecting the ring gear of the third gear unit to the carrier of the second gear unit;

first brake for releasably holding the carrier of the third gear unit against rotation; and a second brake for releasably holding the sun gear of the third gear unit against rotation.

2. The transmission of claim 1 further comprising:

a hydrokinetic torque converter having an impeller driveably connected to the power source; and a turbine hydrokinetically coupled to the impeller and driveably connected to the input.

3. The transmission of claim 1 further comprising:

a transfer case driveably connected to the output, for transmitting power continually to a first set of vehicle wheels and for transmitting power selectively to a second set of vehicle wheels.

4. A multiple speed transmission for an automotive vehicle having a power source, comprising:

an input for carrying torque between the power source and a planetary gear system;

an output;

a planetary gear system comprising first, second and third planetary gear units, each gear unit including a sun gear, a ring gear, planet pinions meshing with the sun gear and ring gear, and a carrier rotatably supporting the planet pinions;

the input being connected to the sun gear of the second gear unit, the output being connected to the ring gear of the third gear unit, the sun gear of the first gear unit being held against rotation, the ring gear of the first gear unit and the carrier of the second gear unit being connected mutually, and the ring gear of the second gear unit and the sun gear of the third gear unit being connected mutually;

a forward clutch for releasably connecting the carrier of the second gear unit and the carrier of the third gear unit;

second clutch for releasably connecting the carrier of the first gear unit to the ring gear of the second gear unit;

a third clutch for releasably connecting the ring gear of the third gear unit to the carrier of the second gear unit; and first brake for releasably holding the carrier of the third gear unit against rotation.

5. The transmission of claim 4 further comprising:

a fourth clutch for releasably connecting the input and the carrier of the first gear unit.

6. The transmission of claim 4 further comprising:

a second brake for releasably holding the sun gear of the third gear unit against rotation.

7. The transmission of claim 4 further comprising:

a hydrokinetic torque converter having an impeller driveably connected to the power source; and a turbine hydrokinetically coupled to the impeller and driveably connected to the input.

8. The transmission of claim 4 further comprising:

a transfer case driveably connected to the output, for transmitting power continually to a first set of vehicle wheels and for transmitting power selectively to a second set of vehicle wheels.

9. A powertrain for an automotive vehicle, comprising:

a power source;

a multiple speed transmission comprising:

an input for carrying torque between the power source and a planetary gear system;

an output;

a planetary gear system comprising first, second and third planetary gear units, each gear unit including a sun gear, a ring gear, planet pinions meshing with the sun gear and ring gear, and a carrier rotatably supporting the planet pinions;

the input being connected to the sun gear of the second gear unit, the output being connected to the ring gear of the third gear unit, the sun gear of the first gear unit being held against rotation, the ring gear of the first gear unit and the carrier of the second gear unit being connected mutually, and the ring gear of the second gear unit and the sun gear of the third gear unit being connected mutually;

a clutch for releasably connecting the carrier of the second gear unit and the carrier of the third gear unit;

a second clutch for releasably connecting the carrier of the first gear unit to the ring gear of the second gear unit;

a third clutch for releasably connecting the ring gear of the third gear unit to the carrier of the second gear unit;

first brake for releasably holding the carrier of the third gear unit against rotation; and a second brake for releasably holding the sun gear of the third gear unit against rotation.

10. The powertrain of claim 9 further comprising:

a fourth clutch for releasably connecting the input and the carrier of the first gear unit.

11. The powertrain of claim 9, further comprising:

a transfer case driveably connected to the output, for transmitting power continually to a first set of vehicle wheels and for transmitting power selectively to a second set of vehicle wheels.

12. The transmission of claim 9 further comprising:

a hydrokinetic torque converter having an impeller driveably connected to the power source; and a turbine hydrokinetically coupled to the impeller and driveably connected to the input.

13. The transmission of claim 9 further comprising:

a transfer case driveably connected to the output, for transmitting power continually to a first set of vehicle wheels and for transmitting power selectively to a second set of vehicle wheels.

*14. A powertrain for an automotive vehicle, comprising:*

*a power source;*

*a transmission including a first input driveably connected to the power source, a first output, and epicyclic gearing located in a torque path between the first input and the first output, the epicyclic gearing producing multiple forward gears, a reverse gear and a low range gear having a torque ratio that is greater than a torque ratio of a lowest gear of the forward gears, wherein the transmission automatically produces gear shifts among the forward gears, and the transmission produces the low range gear only in response to manual selection of low range gear operation of the transmission; and*

*a transfer case including a second input driveably connected to the first output and a second output continually driveably connected to a first set of vehicle wheels and selectively driveably connected to a second set of vehicle wheels, the transfer case providing no low-range torque ratio.*

*15. The powertrain of claim 14, wherein the transfer case produces only one ratio of a speed of the second input to a speed of the second output.*

*16. The powertrain of claim 14, wherein the transfer case produces only one speed ratio, the magnitude of said speed ratio being 1.0.*

*17. The powertrain of claim 14, wherein the low range gear has a torque ratio whose magnitude is about double the torque ratio of the lowest gear of the forward gears.*

*18. The powertrain of claim 14, wherein the transmission shifts automatically among at least four forward gears.*

*19. The powertrain of claim 14, wherein the transmission shifts automatically among five forward gears.*

*20. The powertrain of claim 14, wherein the transmission produces the low range gear in response to manual selection of low-range operation and without stopping the vehicle.*

*21. The powertrain of claim 14, wherein the transmission discontinues operation in the low range gear without stopping the vehicle.*

*22. The powertrain of claim 14, further comprising:*

*a hydrokinetic torque converter having an impeller driveably connected to the power source; and*

*a turbine hydrokinetically coupled to the impeller and driveably connected to the first input.*

*23. The powertrain of claim 14, wherein the low range gear has a torque ratio whose magnitude is equal to or greater than 5.0.*

* * * * *